July 19, 1949.  F. C. SMITH  2,476,461
EDGING DEVICE FOR LAWNS
Filed March 8, 1946
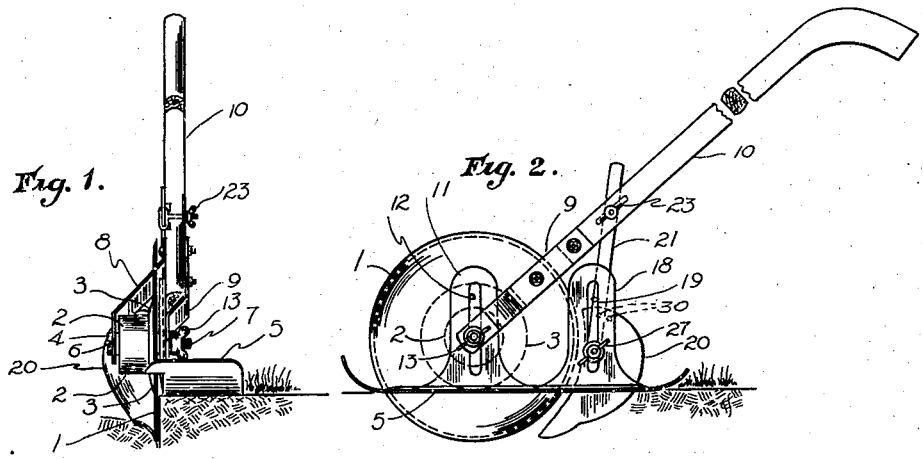
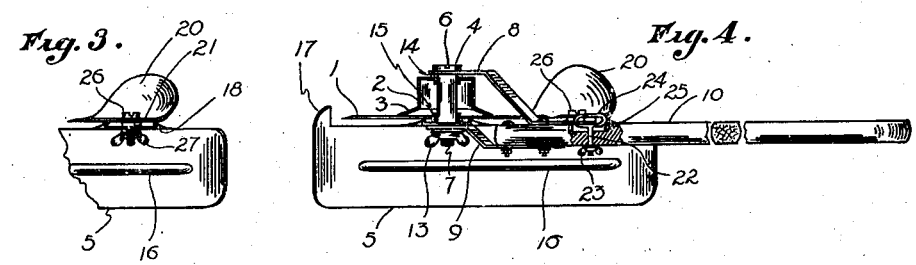
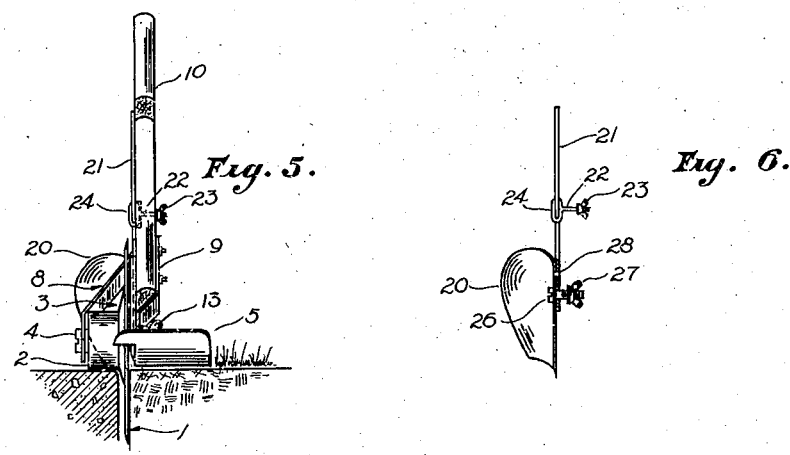
INVENTOR.
FRANK CARL SMITH
BY
Harness, Dickey & Pierce
ATTORNEYS.

Patented July 19, 1949

2,476,461

UNITED STATES PATENT OFFICE 2,476,461

EDGING DEVICE FOR LAWNS

Frank Carl Smith, Detroit, Mich.

Application March 8, 1946, Serial No. 653,030

3 Claims. (Cl. 97—227)

My invention relates to a tool for trimming lawns adjacent the edges of garden plots, walks, and drives. The principal object is to provide a tool having an improved construction and arrangement of grass cutting and earth displacing elements readily adjustable to the variety of conditions encountered in the use of such tools, and a design that will be inexpensive to manufacture.

Figure 1 is a front elevational view of the tool applied to the edge of a lawn bordering a garden plot.

Figure 2 is a side elevational view taken from the right with reference to Figure 1.

Figure 3 is a plan view of the plow member and a fragmentary plan view of a portion of the guide runner forming a part of the tool.

Figure 4 is a plan view of the tool shown in Figure 2 and showing the guide roller portion in cross section.

Figure 5 is a front elevational view of the tool applied to the lawn at the edge of a cement walk.

Figure 6 is a front elevational view of the plow element of the tool and its supporting arm.

The tool comprises in general a circular rotatable cutting blade provided with a rolling or rotatable guide on one side, an adjustable sliding guide runner on the opposite side, and an adjustable plow element at the rear of the rotatable cutter. The cutting element and the guide are attached to a handle, and the plow element is adjustably supported by both the sliding guide runner and the handle.

The numeral 1 indicates a flat circular rotatable cutting blade to one side of which is attached a guide roller member 2 by a spider 3 which may be secured to both the roller member 2 and the blade 1 by welding or other suitable means. The blade 1 together with the guide roller 2 are rotatably mounted upon a common axle member 4. As shown, the axle member 4 is provided at one end with a slotted head 6 and at the opposite end with a reduced threaded extension 7. The axle member 4 is mounted at its opposite ends in the lower ends of arms 8 and 9 between which, at their upper ends, is secured the lower end of the handle member 10. The arms 8 and 9 are offset to the left, as viewed in Figures 1 and 5, so that the blade 1 will clear the lower end of the handle 10. The guide runner 5, which is positioned on the opposite side of the blade 1 from the guide roller 2, is provided at its inner edge with an upstanding ear 11 having a closed elongated slot 12 disposed perpendicular to the horizontal portion of the runner. This upstanding ear 11 on the runner 5 is secured between the lower end of the support arm 9 and the cutter blade 1, and the reduced threaded end 7 of the axle member 4 extends first through the slot 12 in the upstanding ear 11 and then through a round hole in the end of the arm 9. The axle member 4 is secured to the arm 9 and the ear 11 by a wing nut 13 turned on the threaded end 7. Laterally flanged bearing members 14 and 15 for the axle 4 are press fitted in a central opening in the outer end of the roller 2 and in the central opening in the blade 1.

The opposite ends of the runner 5 are turned upwardly as shown and the horizontal portion is provided with a strengthening depression 16. The upright slotted ear 11 of the runner 5 is provided with strengthening flanges along its edges, and the forward upturned end of the runner 5 is provided with a lateral projection 17 which extends laterally beyond the plane of and guards the forward edge of the blade 1. The runner 5 is also provided with a second upstanding ear 18 on its inner edge adjacent its rear end. This ear 18 also is provided with an elongated closed slot 19 disposed perpendicular to the horizontal portion of the runner 5 and the edges of the ear are flanged laterally to provide rigidity.

At the rear of the blade 1 is disposed a plow member 10 having its point and landside disposed in the plane and to the rear of the blade 1 and its share and mold board extending outwardly opposite the rear inner edge of the runner 5. Secured to the landside of the plow is a supporting arm 21 which extends upwardly and is attached to the handle 10 by means of the bolt 22 which extends through the handle 10, and wing nut 23. The bolt 22 is provided with a head in the form of a keeper loop 24 which slidably fits in a recess 25 in the handle 10 and provides a keeper through which the arm 21 passes and by means of which it may be clamped in fixed position against the handle 10 by tightening the wing nut 23. The lower end of the arm 21 is secured to the landside of the plow 20 by means of a head slotted bolt 26 and the wing nut 27. The end of the arm 21 is positioned between the landside of the plow 20 and the rear upstanding ear 18 on the runner 5. The securing bolt 26 passes through a hole in the landside of the plow then through a hole in the end of the arm 21 and finally through the elongated slot 19 in the ear 18 on the runner 5. The angular position of the plow may be adjusted relative to the arm 21 by means of a pin 28 (Fig. 6) extending laterally from the arm 21 and adapted to engage either of the two holes 30 (Fig. 2) in the landside of the plow 20.

The plow may be adjusted with respect to depth of penetration by shifting the arm 21 upwardly or downwardly as desired and securing it in the desired position by loosening and tightening the wing nuts 23 and 27.

The depth of the penetration of the rotary cutter 1 may be adjusted by loosening the wing nut 13 and shifting the axle 4 upwardly or downwardly in the slotted upright ear 11 on the runner 5. The angularity of the handle 10 may be adjusted by loosening the wing nuts 13, 23 and 27, shifting the handle to the desired angle and tightening the nuts.

Ordinarily it will not be desired to use the plow member 20 except for trimming the adjacent edges of the lawn bordering garden plots as illustrated in Figure 1. When the tool is used to edge the lawn along walks, as shown in Figure 5, the plow may be raised out of operative position or its penetration may be regulated to any desired degree by adjustment.

What I claim is:

1. A lawn edger device for edging sidewalks, lawn borders, flower beds and the like, comprising a supporting and guide runner member which adjustably supports a cutter and handle assembly and a plow assembly, said member having a horizontal earth bearing portion and upstanding spaced ears on one edge thereof, said cutter and handle assembly including a rotary cutting blade having a guide roller coaxial therewith and secured to one side thereof and a handle adapted to be grasped adjacent the upper end thereof by a user of the device, said plow assembly including a mold board type plow member having its leading edge disposed in substantially the same vertical plane as said cutting blade and positioned behind said cutting blade and a generally vertically extending arm element, means including an axle adjustably securing said rotary cutting blade, guide roller and the lower end of said handle to the front ear of said guide runner and supporting member, means adjustably connecting the upper end of said arm element to said handle intermediate the ends thereof, means adjustably connecting the lower end of said arm element to said plow member and to the rear ear of said guide runner and supporting member, whereby said guide runner acts as a common support for said cutter and handle assembly and said plow assembly and whereby the relative positions of said assemblies with respect to each other and to said guide runner and supporting member may be varied.

2. A lawn edger device for edging sidewalks, lawn borders, flower beds and the like, comprising a supporting and guide runner member having a horizontal earth bearing portion, a rotary cutting blade having a guide roller coaxial therewith and secured to one side thereof, a plow member in substantially the same plane with said rotary cutting blade and positioned at the rear thereof, a handle, means including an axle for said rotary cutting blade and guide roller adjustably securing the same to said guide runner and to the forward end of said handle, whereby said rotary cutting blade, guide roller, and handle are adjustably supported by said guide runner and supporting member, a supporting arm extending between said handle and said plow member, means adjustably connecting the upper end of said supporting arm to said handle intermediate the ends thereof, and means adjustably connecting the lower end of said supporting arm and said plow member to said guide runner and supporting member, whereby said plow member is adjustably supported by said guide runner and whereby the relative positions of said guide runner and supporting member, said rotary cutting blade, and said plow member, may be varied.

3. A lawn edger device for edging sidewalks, lawn borders, flower beds and the like, comprising a supporting and guide runner member having a horizontal earth bearing portion, a rotary cutting blade having a guide roller coaxial therewith and secured to one side thereof, a plow member in substantially the same plane with said rotary cutting blade and positioned at the rear thereof, a handle, means including an axle for said rotary cutting blade and guide roller adjustably securing the same to said guide runner and to the forward end of said handle, whereby said rotary cutting blade, guide roller, and handle are adjustably supported by said guide runner and supporting member, a supporting arm extending between said handle and said plow member, means adjustably connecting the upper end of said supporting arm to said handle intermediate the ends thereof, means adjustably connecting the lower end of said supporting arm and said plow member to said guide runner and supporting member, whereby said plow member is adjustably supported by said guide runner and whereby the relative positions of said guide runner and supporting member, said rotary cutting blade, and said plow member, may be varied, and additional means adjustably connecting said plow member to said supporting arm for angular movement with respect thereto and to said rotary cutting blade.

FRANK CARL SMITH.

REFERENCES CITED

The following references are of record in the file of this patent:

UNITED STATES PATENTS

| Number | Name | Date |
|---|---|---|
| 859,263 | Thomassen et al. | July 9, 1907 |
| 1,249,385 | Hamman | Dec. 11, 1917 |
| 1,495,007 | Evans | May 20, 1924 |
| 1,883,817 | Olsen et al. | Oct. 18, 1932 |
| 1,964,366 | Schwarz | June 26, 1934 |